United States Patent
Sridharan (10) Patent No.: US 9,972,037 B1
(45) Date of Patent: May 15, 2018

(54) SYSTEMS AND METHODS FOR AUTHORIZATION AND BILLING OF USERS FOR WIRELESS CHARGING

(71) Applicant: T-Mobile USA, Inc., Bellevue, WA (US)

(72) Inventor: Srinivasan Sridharan, Bellevue, WA (US)

(73) Assignee: T-Mobile USA, Inc., Bellevue, WA (US)

(*) Notice: Subject to any disclaimer, the term of this patent is extended or adjusted under 35 U.S.C. 154(b) by 0 days. days.

(21) Appl. No.: 15/615,308

(22) Filed: Jun. 6, 2017

(51) Int. Cl.
*H04W 72/00* (2009.01)
*G06Q 30/04* (2012.01)
*H02J 50/20* (2016.01)
*H02J 50/80* (2016.01)

(52) U.S. Cl.
CPC .............. *G06Q 30/04* (2013.01); *H02J 50/20* (2016.02); *H02J 50/80* (2016.02)

(58) Field of Classification Search
CPC ........... G06Q 30/04; H02J 50/80; H02J 50/20
USPC ............................... 455/406, 552.1, 572, 573
See application file for complete search history.

(56) References Cited

U.S. PATENT DOCUMENTS

| | | | | |
|---|---|---|---|---|
| 6,097,937 A * | 8/2000 | Sawyer | ................. | H04M 15/00 455/406 |
| 6,157,173 A * | 12/2000 | Baranowski | .......... | H02J 7/0068 320/152 |
| 6,184,651 B1 * | 2/2001 | Fernandez | .............. | H02J 7/025 320/108 |
| 6,188,888 B1 * | 2/2001 | Bartle | ....................... | H02J 7/00 455/417 |
| 9,232,348 B2 * | 1/2016 | Huttunen | ................. | H04B 7/26 |
| 9,836,957 B2 * | 12/2017 | Gerszberg | ........... | H04L 12/1845 |
| 2013/0179061 A1 * | 7/2013 | Gadh | .................. | B60L 11/1842 701/123 |
| 2015/0056920 A1 * | 2/2015 | Huttunen | ................. | H04B 7/26 455/41.2 |
| 2016/0099757 A1 * | 4/2016 | Leabman | ............. | H04B 5/0037 307/104 |
| 2016/0134317 A1 * | 5/2016 | Hu | ....................... | H04B 1/3816 455/558 |
| 2016/0191121 A1 * | 6/2016 | Bell | ..................... | H04B 5/0037 307/104 |
| 2016/0301243 A1 * | 10/2016 | Zeine | ..................... | G09G 5/003 |
| 2017/0282736 A1 * | 10/2017 | Goei | .................. | B60L 11/1838 |

* cited by examiner

*Primary Examiner* — Marceau Milord

(74) *Attorney, Agent, or Firm* — Lee & Hayes, PLLC

(57) ABSTRACT

Systems and methods for providing wireless charging via radio-frequency (RF) carrier wave. The system can enable user equipment (UE) to charge wirelessly using RF waves when the UE is not it use. The system can activate wireless charging based in part on the battery level of the UE. The system can also initiate wireless charging when the UE is sufficiently idle (e.g., not being used for a call or web browsing). The system can also ensure that the signal strength of the carrier waves at the UE is sufficiently strong to support wireless charging. One or more system components can ensure that the threshold charge level, threshold signal strength, and threshold utilization rate are met and that the UE is authorized for wireless charging on the network. Wireless charging may be billed to the user according to usage (e.g., kWh), at a flat rate, or per instance.

20 Claims, 6 Drawing Sheets

SYSTEMS AND METHODS FOR AUTHORIZATION AND BILLING OF USERS FOR WIRELESS CHARGING

BACKGROUND

Cellular phones, smart phones, laptops, and other cellular devices are ubiquitous. Users may access cellular voice and data networks using a smart phone, for example, to make calls, browse the internet, text message, and use other services. Indeed, one merely has to sit in a public place to observe a high percentage of people engaged in using one or more cellular devices. Indeed, at any given time, many users may be using a laptop computer—connected to a wireless or cellular network—and a smart phone at the same time.

Improving the performance of cellular devices is a constant goal of manufacturers and developers. As the speed and power of mobile processors, the sizes of screens, and other features evolve, however, there is often a need for increased battery capacity. To some extent, though, battery technology has lagged behind, for example, processor and memory technology. As a result, battery life in devices used by heavy internet users, for example, may be less than a day. This generally requires the user to plug the device into a wall socket or universal serial bus (USB) port to recharge for a significant length of time, which can be inconvenient and in some cases, is simply not available.

DETAILED DESCRIPTION

Examples of the present disclosure relate to a system for enabling and billing users for wireless charging services. The system can include user equipment (UE), such as, for example, a cellular phone, tablet computer, or laptop with wireless charging capabilities. The system can also include various types of macro cell (commonly called "cell towers"), a home public land mobile network (HPLMN), including a Third-Generation Partnership Program (3GPP) authentication authorization and accounting (AAA) server, and other cellular components. The system can ensure that users are authorized for wireless charging, that current conditions are acceptable for wireless charging, and provide billing for wireless charging. The wireless charging can be billed by consumption (e.g., kilowatt hours, or kWh), by use, or using a monthly flat rate.

To simplify and clarify explanation, the system is described below for use with a device connected to cellular data network and/or a cellular voice network. Once of skill in the art will recognize, however, that the system could also be used for other types of wireless networks and connections such as, for example, Wi-Fi, microwave, and Bluetooth®. Thus, the system can be used anytime a device needs wireless charging from a wireless network.

Battery life and power consumption are major factors in the success of many mobile devices. Manufacturers and cellular providers tout the talk and standby time of new models in marketing campaigns, for example. Processing power and memory are also important, however; and with increased processing power generally comes increased power consumption. Battery size is also important. All things being equal, a larger batter will have more power capacity than a smaller battery, but manufacturers must be wary to maintain a convenient package. A smart phone, for example, is often carried in a user's pocket or purse, where small and slim design is advantageous.

One solution to these competing forces is to provide wireless charging via radio frequency (RF) and electromagnet power from a cell tower. In this configuration, a UE that is not currently in use, or is on standby, can be charged using excess energy from the RF carrier waves emanating from a cell tower or Wi-Fi router. Thus, while not in use, the UE can be charged without input from, or even the knowledge of, the user. Indeed, apart from back-end and billing management, this method of charging costs MNOs nothing. In other words, the energy is being transmitted by the cell tower regardless of whether it is being used for charging or not. What is needed, however, is a method to determine which UEs are authorized for wireless charging on a particular network (e.g., either directly or through a roaming agreement) and to provide the necessary billing for these services. It is to such systems and methods that examples of the present disclosure are primarily directed.

Figure 1:
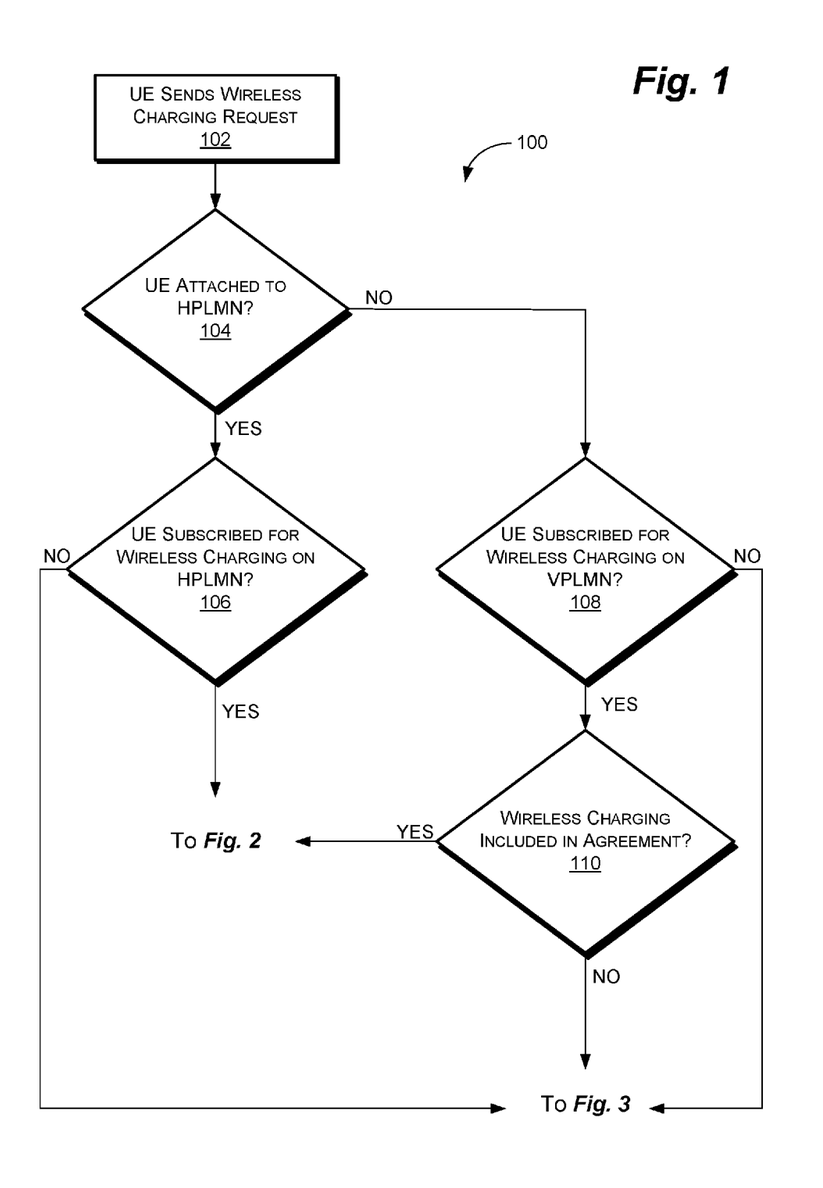
FIG. 1 depicts a method to determine if a user is authorized for wireless charging, in accordance with some examples of the present disclosure.

As shown in FIG. 1, example of the present disclosure can comprise a method 100 for determining if a UE is authorized for wireless charging on a cellular, or other wireless, network. Because wireless charging is a new technology, the UE must have the technical capability to charge wirelessly and must be authorized to wireless charge on the network to which it is connected. As discussed below, the MNO may include wireless charging as part of a cellular communications package, may charge a flat rate (e.g., $5/mo.), or may charge according to usage (e.g., by the kWh, like a home electricity bill).

At 102, therefore, the UE can send a wireless charging request to the network. The request may come from software or hardware on the UE. In many cases, wireless charging is a function of the chipset on the UE and is provided by the manufacturer. An application ("app"), or other software, however, could also control wireless charging for the UE. Obviously, a UE that does not have wireless charging capabilities would not send, or be programmed to send, a wireless charging request.

At 104, a back-end component of the cellular network can determine if the UE is a subscriber to the network. The system can check to see if the UE is attached to the home public land mobile network (HPLMN), meaning that the UE is associated with a subscriber of the network to which the UE is connected (i.e., as opposed to a roaming UE). This function may be performed by the home location register (HLR) or a home subscriber server (HSS), for example, where user profiles for a particular network are stored.

At 106, if the UE is attached to the HPLMN, the system can then check to see if the user is authorized for wireless charging. If the user has wireless charging included as a benefit of their current wireless plan, for example, or has paid the necessary flat fee, then the user (or rather, the UE) can be deemed authorized for wireless charging. A method 200 for wireless charging is discussed below with reference to FIG. 2. The authorization for wireless charging may be verified by one or more back-end network components such as, for example, the 3GPP HLR, HSS, or AAA server.

At 108, if the UE is associated with a network associated with another MNO—i.e., the UE is connected to the visitor public land mobile network (VPLMN)—the system can determine if the UE is authorized for wireless charging on its home network. In other words, in order to use wireless charging on the VPLMN, the UE must first be authorized for wireless charging. If the UE is not authorized for wireless charging on its home network, then it is most likely not authorized for wireless charging when roaming. In this case, a method 300 to provide the user with an option to add wireless charging is discussed below with reference to FIG. 3.

At 110, if the UE is authorized for wireless charging on the HPLMN of the UE, the system can determine if the UE is authorized for wireless charging when roaming. Thus, the system can determine if the user is authorized for wireless charging on the visitor public land mobile network (VPLMN) and then determine if wireless charging is part of the roaming agreement between the HPLMN and the VPLMN. Again, the authorization for wireless charging may be verified by one or more back-end network components such as, for example, the HLR, 3GPP AAA server, HSS, discussed below with reference to FIG. 6, below. If the UE is authorized for roaming wireless charging, the method 200 for wireless charging is discussed below with reference to FIG. 2.

In some examples, authorization to charge when roaming may be part of a reciprocal trade-out agreement (RTA). In other words, if the MNOs have an established RTA, a first MNO can enable wireless charging for a second MNO at no charge, and vice-versa, with each MNO billing its customers directly. In other examples, users may be authorized for roaming wireless charging via a roaming agreement between two MNOs at a particular rate. Thus, a first MNO can bill wireless roaming charged to a second MNO according to the agreement and usage, and vice-versa.

If, at any step 106, 108, 110 of the method 100, the UE is deemed not to be authorized for wireless charging, the method 300 to provide the user with an option to add wireless charging is discussed below with reference to FIG. 3.

Figure 2:
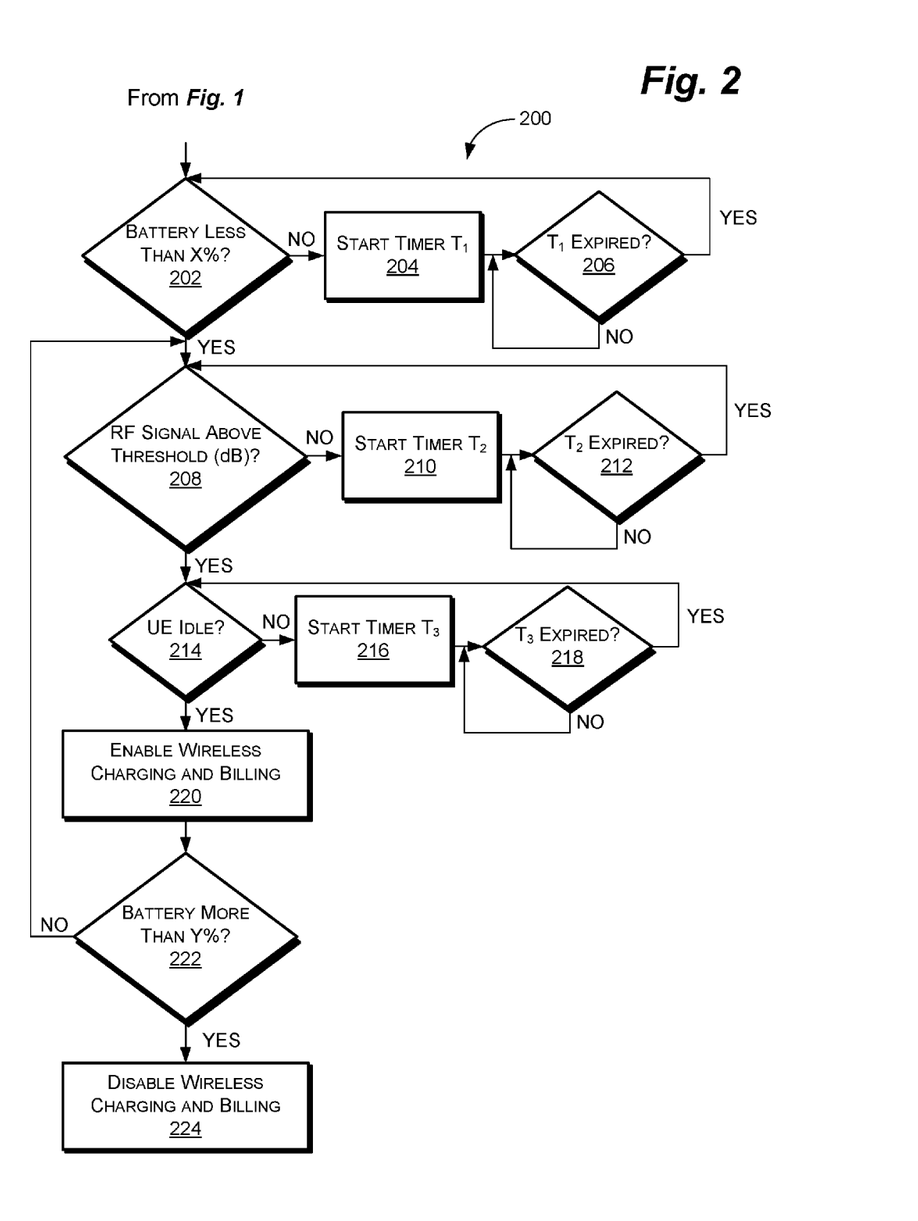
FIG. 2 depicts a method to wireless charge user equipment (UE), in accordance with some examples of the present disclosure.

As shown in FIG. 2, once a UE is determined to be authorized for wireless charging—whether roaming or not—examples of the present disclosure can also comprise a method 200 for providing wireless charging over a wireless (e.g., cellular, microwave, or Wi-Fi) network. The method can stop and start wireless charging based on signal strength, battery charge level, and phone status (e.g., idle vs. in-use), among other things. The method 200 can enable the UE to be charged wirelessly—and to be billed for same—with little or no input from the user.

At 202, the method 200 can determine if the battery charge level is sufficiently low to warrant wireless charging. This value is somewhat arbitrary and can be set by the MNO. In some examples, the first threshold charge level can be a percentage of charge (e.g., 50, 60, 70, or 80%). Below the first threshold charge level, wireless charging is initiated; above the first threshold charge level wireless charging is not initiated (or is stopped). As mentioned above, however, wireless charging itself incurs no additional cost to the MNO (apart from upkeep and some initial investment in management software/hardware). As a result, in some examples, any charge level below 100% may initiate wireless charging.

The battery charge level can be provided to the MNO by the UE. In some examples, the charge level may be reported by the UE chipset directly to the MNO, for example, or may be provided by the operating system (OS) of the UE. In other examples, the charge level can be reported by an app on the UE that includes one or more features to enable wireless charging.

At 204, if the battery level is not below the first threshold charge level, the method 200 can start a first timer, $T_1$, to recheck the battery level of the UE periodically. $T_1$ can be set according to, for example, typical battery consumption of a particular type of UE, utilization of the UE (e.g., idle time vs. in-use time), or another suitable parameter. In some examples, as the battery level on the UE approaches the first threshold charge level or simply gets lower in general (regardless of the first threshold charge level), $T_1$ can be reduced to cause the method 200 to recheck more frequently.

At 206, the method 200 can determine if $T_1$ has expired. If $T_1$ has not yet expired, the method 200 continues to count down and recheck $T_1$. If $T_1$ has expired, the method 200 can recheck the battery level to determine if it has fallen below the first threshold charge level. If not, the method 200 can reset $T_1$ to recheck after a predetermined amount of time. As discussed above, the predetermined amount of time may vary based on the battery level or other factors.

AT 208, when the battery level on the UE is determined to be below the first threshold charge level, the method 200 can then determine if the current RF signal from a source is sufficiently strong to provide wireless charging. The source may be the RF signal from a cell tower, or another cellular transceiver, for example, a Wi-Fi router, or another wireless communications device. In the cellular case, if the UE is too far from a cell tower, for example, or geographic obstructions partially obscure the line-of-sight between the UE and the cell tower, the signal may not be strong enough to provide wireless charging.

The signal strength can vary widely depending on the distance between the UE and the source, obstacles, interference, and the number of UEs connected to the source, among other things. In addition, the threshold signal level for wireless charging can vary according the charging system, the type of UE, and other factors. A more sophisticated wireless charging system or UE, for example, may have a lower (weaker) threshold signal strength than a less sophisticated one.

In general, the signal strength may vary between, for example, −55 decibels milliwatt (dBm) (strong) and −95 dBm (weak). At 210, if the signal strength is determined to be below the threshold signal level (e.g., below −85 dBm), the method 200 can start a second timer, $T_2$, to check periodically whether the signal strength has changed. In some examples, $T_2$ can be varied based on whether the UE is moving or not. In other words, if the UE is in a moving car, for example, then the signal strength will tend to change more quickly and/or frequently than if the UE is stationary. In some examples, $T_2$ may also be reduced as the UE approaches the first threshold charge level or as charge level wanes in general (e.g., the lower the charge level, the shorter $T_2$ is set).

At 212, the method 200 can determine if $T_2$ has expired. If $T_2$ has not yet expired, the method 200 continues to count down and recheck $T_2$. If $T_2$ has expired, the method 200 can recheck the signal strength to determine if it has increased above the threshold signal strength. If not, the method 200 can reset $T_2$ to recheck after a predetermined amount of time. As discussed above, as the method 200 progresses, $T_2$ may vary according to the battery level, movement, or other factors.

At 214, if the battery level has fallen below first threshold charge level and the signal strength is above the threshold signal strength, the method 200 can determine if the UE is idle (or sufficiently idle). When the UE is in use for a voice call, for example, some or all of the energy required for wireless charging is actually being consumed for wireless communications. Thus, some functions (e.g., text messaging or e-mail), which are less data intensive (e.g., text messaging or e-mail) may enable simultaneous wireless charging, while functions that are more data intensive (e.g., voice calls and web browsing) may not. Thus, the method 200 can determine if the utilization of the UE (or rather, the RF signal) is below a threshold utilization rate (i.e., if there is sufficient remaining energy to enable wireless charging).

The threshold utilization rate may be different for different MNOs, different charging systems, or different UEs. In some examples, the threshold utilization rate may require that the UE be essentially idle. In other words, if the UE is in use on a voice call, checking e-mail, browsing the web, text messaging, or any other functions that use the RF signal from the source, then wireless charging is not initiated. In other example, the UE may be below the threshold utilization rate for some uses (e.g., text messaging) and not others (e.g., web browsing).

In some examples, the threshold utilization rate can be given as a percentage of the energy that is available from the RF signal for charging, as opposed to for other uses (e.g., communications). Thus, in some examples, the threshold utilization rate must be essentially 0% (or close to 0%) with no active functions on the UE and the UE on standby. In other examples, the threshold utilization rate must simply be low enough to enable some wireless charging (e.g., below 10, 30, or 50%). In some examples, as before, the threshold utilization rate can be a product of the sophistication of the wireless charging system, the UE, or other factors.

At 216, if the utilization rate is determined to be above the threshold utilization rate (e.g., above 10%), the method 200 can start a third timer, $T_3$, to check periodically whether the utilization rate of the UE has changed. In some examples, $T_3$ can be a set time for each user (e.g., 5 or 10 seconds). In other examples, $T_3$ can be varied based on the historical utilization rate of the UE. In other words, if the UE belongs to a user who is often on the phone and/or web browsing, $T_3$ may be set to a longer time than a UE that spends more time in standby mode, or vice-versa. As above, in some examples, $T_3$ may also be reduced as the UE approaches the first threshold charge level or as charge level wanes in general (e.g., the lower the charge level, the shorter $T_3$ is set).

At 218, the method 200 can determine if $T_3$ has expired. If $T_3$ has not yet expired, the method 200 continues to count down and recheck $T_3$. If $T_3$ has expired, the method 200 can recheck the utilization rate to determine if it has decreased below the threshold utilization rate (e.g., 50%). If not, the method 200 can reset $T_3$ to recheck after a predetermined amount of time. As discussed above, as the method 200 progresses, $T_3$ may vary according to the battery level, user history, or other factors.

At 220, when the charge level is below the first threshold charge level, the signal strength is above the threshold signal strength, and the utilization rate is below the threshold utilization rate, the method 200 can initiate wireless charging and billing. This can include the chipset, OS, or app initiating wireless charging on the UE internally. In addition, or alternatively, this can also include a network component (e.g., the HSS, HLR, or 3 GPP AAA server) initiating wireless charging and/or billing. As mentioned above, billing can be, for example, flat rate, usage-based, or otherwise.

At 222, the method 200 can determine whether the UE is sufficiently charged to stop wireless charging. The second threshold charge level may be the same as, or different than, the first threshold charge level. In some examples, the second threshold charge level may be higher than the first threshold charge level to prevent the wireless charging system from activating and deactivating constantly. This the first threshold charge level may be 50%, for example, and the second threshold charge level may be 80%. In some examples, the second threshold charge level can be 100%—i.e., the wireless charging system activates any time the battery is not fully charged.

Of course, all of the threshold levels mentioned herein are somewhat arbitrary. The threshold levels can be set by the MNO according to a particular network, location, or UE. The threshold levels can also be set by the manufacturer of the UE based on the capabilities of the UE or input from various MNOs. The threshold level can also be set by the user. In other words, a user who is billed for usage, for example, may set the threshold charge level such that wireless charging is only used as a last resort (e.g., 5 or 10%), while a user who is billed a flat rate may set the threshold charge level such that the UE essentially charges anytime it is not fully charged and is sufficiently idle (e.g., 95 or 98%). Thus, all threshold levels discussed herein are intended to be purely illustrative and not intended to limit the scope of the present disclosure in any way.

At 224, if the charge level is greater than, or equal to, the second threshold charge level, the method 200 can disable wireless charging and/or billing. As mentioned above, some users may be billed for consumption. In this case, the method 200 can stop billing the user when the UE stops wireless charging. In other cases, users may be billed a flat rate. In this case, the method 200 may nonetheless indicate wireless charging times for tracking and development purposes, for example.

In some examples, the user may not initially be authorized for wireless charging, but may want to add wireless charging on their UE and account, as applicable. The user may have acquired a new UE that adds wireless charging capabilities, for example, the MNO may have recently added wireless charging to their network, or the user may simply have changed their mind after initially declining wireless charging. Regardless, examples of the present disclosure can also comprise a method 300 for enabling a user to upgrade to wireless charging.

At 302, when a UE or a user is determined to not have wireless charging activated, for whatever reason, the method 300 can provide a message on the UE to ask the user if they would like to activate wireless charging. In some examples, the method 300 can display a message on a touchscreen of the UE, for example, with buttons to enable the user to accept or decline wireless charging. In other examples, the method 300 can send a text message to the UE instructing the user to reply to the text message to accept or decline wireless charging (e.g., "Text YES to 025546 to activate wireless charging"). In still other examples, the app on the UE may ask the user to update the settings on the UE, or otherwise accept wireless charging.

At 304, the method 300 can determined if the user accepted or declined the prompt to activate wireless charging. This may be via an input on the UE (e.g., a touchscreen input indicating yes or no), a particular response to a text message, or a change to one or more settings on the UE. In some examples, wireless charging may be activated on all capable phones and offered free of charge for an introductory period, for example. In this configuration, wireless charging may be activated without input from the user.

At 306, the method 300 can send a message to the appropriate entity (e.g., the 3GPP AAA server) to update the status of the UE to include wireless charging. If the user is connected to the HPLMN, this update may come directly from the UE. If the user is connected to the VPLMN, this update may require compatibility across multiple networks, with the 3GPP AAA server (or other entity) from the home network sending the update to the 3GPP AAA server (or other entity) from the visitor network.

At 308, the method can determine if the status for the UE has been updated to include wireless charging. In some examples, this may take time to propagate through the network. In other examples, the MNO may require the user to call customer service, for example, to avoid erroneous activations. In still other examples, the update may simply not make it from the HPLMN, for example, to the VPLMN due to system incompatibilities, or other issues.

At 310, if the UE is roaming, the method 300 can determine if the UE is authorized for wireless charging when roaming. Thus, the system can determine if the user is authorized for wireless charging on the visitor public land mobile network (VPLMN) and then determine if wireless charging is part of the roaming agreement between the HPLMN and the VPLMN. Again, the authorization for wireless charging may be verified by one or more back-end network components such as, for example, the HLR, 3GPP AAA server, or a home subscriber server (HSS) and/or between components of both MNO networks. If the UE is authorized for roaming wireless charging, the method 200 for wireless charging is discussed above with reference to FIG. 2.

At 312, if, at any point, the user declined or was ineligible for wireless charging, the method 300 can deny wireless charging to the UE. In some cases, the UE may simply not charge using wireless charging. In other examples, the user may be provided a message to contact their MNO to activate wireless charging. In still other examples, the UE may simply display a message stating that the system was unable to activate wireless charging. In some examples, the message may contain an error code or diagnostic code indicating the source of the failure, when available. In this manner, customer support may be better able to assist the user when necessary.

Figure 3:
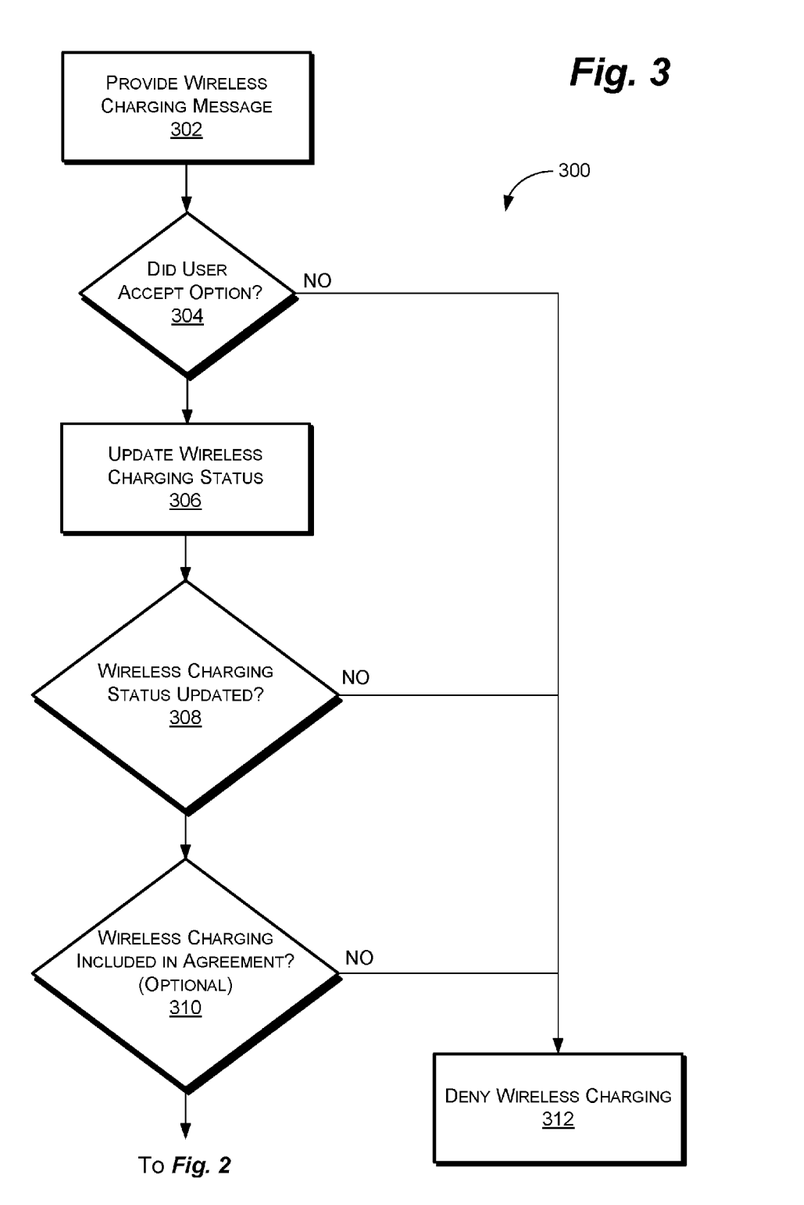
FIG. 3 depicts a method to offer wireless charging to a user, in accordance with some examples of the present disclosure.

FIGS. 1-3 are flow diagrams of illustrative processes illustrated as a collection of blocks in a logical flow graph, which represent a sequence of operations that can be implemented in hardware, software, or a combination thereof. In the context of software, the blocks represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described should not be construed as a limitation, and any number of the described blocks can be combined in any order and/or in parallel to implement the processes.

Figure 4:
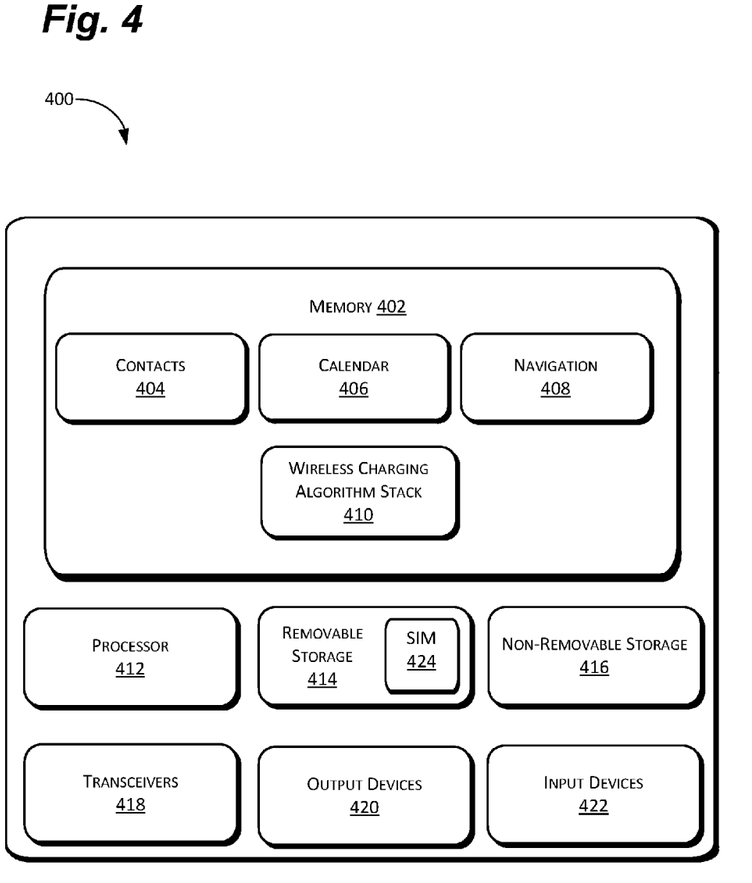
FIG. 4 depicts an example of a UE for a wireless charging system, in accordance with some examples of the present disclosure.

As shown in FIG. 4, the methods 100, 200, 300 can be implemented in conjunction with a variety of electronic devices, such as cell phones, smart phones, tablet computers, and laptops, which are referred to above collectively as UEs 400. The UEs 400 can comprise a number of components to perform the above-mentioned functions. As discussed below, the UEs 400 can comprise memory 402 including many common features such as, for example, the contacts 404, calendar 406, and navigation software 408. In addition, in some examples, the memory 402 can also include a wireless charging algorithm stack 410, discussed below with reference to FIG. 5.

The UEs 400 can also include one or more processor(s) 412, removable storage 414, non-removable storage 416, transceiver(s) 418, output device(s) 420, and input device(s) 422. In some examples, such as for cellular communication devices, the UEs 400 can also include the SIM 424 including the International Mobile Subscriber Identity (IMSI), among other things. In some examples, some, or all, of the functions associated with the UE 400 and methods 100, 200, 300 discussed herein can also be handled by a remote server or other remote network entity.

In various implementations, the memory 402 can be volatile (such as random access memory (RAM)), non-volatile (such as read only memory (ROM), flash memory, etc.), or some combination of the two. The memory 402 can include all, or part, of the wireless charging algorithm stack 410, for example, the functions 404, 406, 408 and an OS for the UEs 400, among other things.

The memory 402 can also comprise contacts 404. The contacts 404 can include names, numbers, addresses, and other information about the user's business and personal acquaintances, among other things. In some examples, the memory 402 can also include a calendar 406, or other software, to enable the user to track appointments and calls, schedule meetings, and provide similar functions. In some examples, the memory 402 can also comprise navigation software 408 such as global positioning system (GPS) and/or cellular location based navigation systems. Of course, the memory 402 can also include other software such as, for example, e-mail, text messaging, social media, and utilities (e.g., calculators, clocks, compasses, etc.).

The UEs 400 may also include additional data storage devices (removable and/or non-removable) such as, for example, magnetic disks, optical disks, or tape. Such additional storage is illustrated in FIG. 4 by removable storage 414 and non-removable storage 416. The removable storage 414 and non-removable storage 416 can store some, or all, of the various programs 404, 406, 408, 404 and methods 100, 200, 300. This can enable the UEs 400 to be fully or partially configured and to enable the systems 400, 600 and methods 100, 200, 300 to present welcome screens, setup menus, GUIs, and other functions to the user via the systems 400, 600 and methods 100, 200, 300, OS, and other programs and functions.

Non-transitory computer-readable media may include volatile and nonvolatile, removable and non-removable tangible, physical media implemented in technology for storage of information, such as computer readable instructions, data structures, program modules, or other data. The memory 402, removable storage 414, and non-removable storage 416 are all examples of non-transitory computer-readable media. Non-transitory computer-readable media include, but are not limited to, RAM, ROM, electronically erasable programmable ROM (EEPROM), flash memory or other memory technology, compact disc ROM (CD-ROM), digital versatile disks (DVD) or other optical storage, magnetic cassettes, magnetic tape, magnetic disk storage or other magnetic storage devices, or any other tangible, physical medium which can be used to store the desired information and which can be accessed by the UEs 400. Any such non-transitory computer-readable media may be part of the UEs 400 or may be a separate database, databank, remote server, or cloud-based server.

In some implementations, the transceiver(s) 418 include any sort of transceivers known in the art. In some examples, the transceiver(s) 418 can include wireless modem(s) to facilitate wireless connectivity with the other UEs, the Internet, and/or an intranet via a cellular connection. Further, the transceiver(s) 418 may include a radio transceiver that performs the function of transmitting and receiving radio frequency communications via an antenna (e.g., Wi-Fi or Bluetooth®). In other examples, the transceiver(s) 418 may include wired communication components, such as a wired modem or Ethernet port, for communicating with the other UEs or the provider's Internet-based network.

In some implementations, the output device(s) 420 include any sort of output devices known in the art, such as a display (e.g., a liquid crystal or thin-film transistor (TFT) display), a touchscreen display, speakers, a vibrating mechanism, or a tactile feedback mechanism. In some examples, the output devices can play various sounds based on, for example, whether the UEs 400 is connected to a network, the type of call being received (e.g., video calls vs. voice calls), the number of active calls, etc. Output device(s) 420 also include ports for one or more peripheral devices, such as headphones, peripheral speakers, or a peripheral display.

In various implementations, input device(s) 422 include any sort of input devices known in the art. For example, the input device(s) 422 may include a camera, a microphone, a keyboard/keypad, or a touch-sensitive display. A keyboard/keypad may be a standard push button alphanumeric, multi-key keyboard (such as a conventional QWERTY keyboard), virtual controls on a touchscreen, or one or more other types of keys or buttons, and may also include a joystick, wheel, and/or designated navigation buttons, or the like.

In some examples, particularly for cellular enabled devices, the UEs 400 can removable storage 414 can include a SIM 102a. As usual, the SIM 102a can store the users IMSI for identification, and other pertinent data, for communication over one or more cellular networks. In some cases, the some or all of the contacts 404 can also be stored in the SIM 102a.

Figure 5:
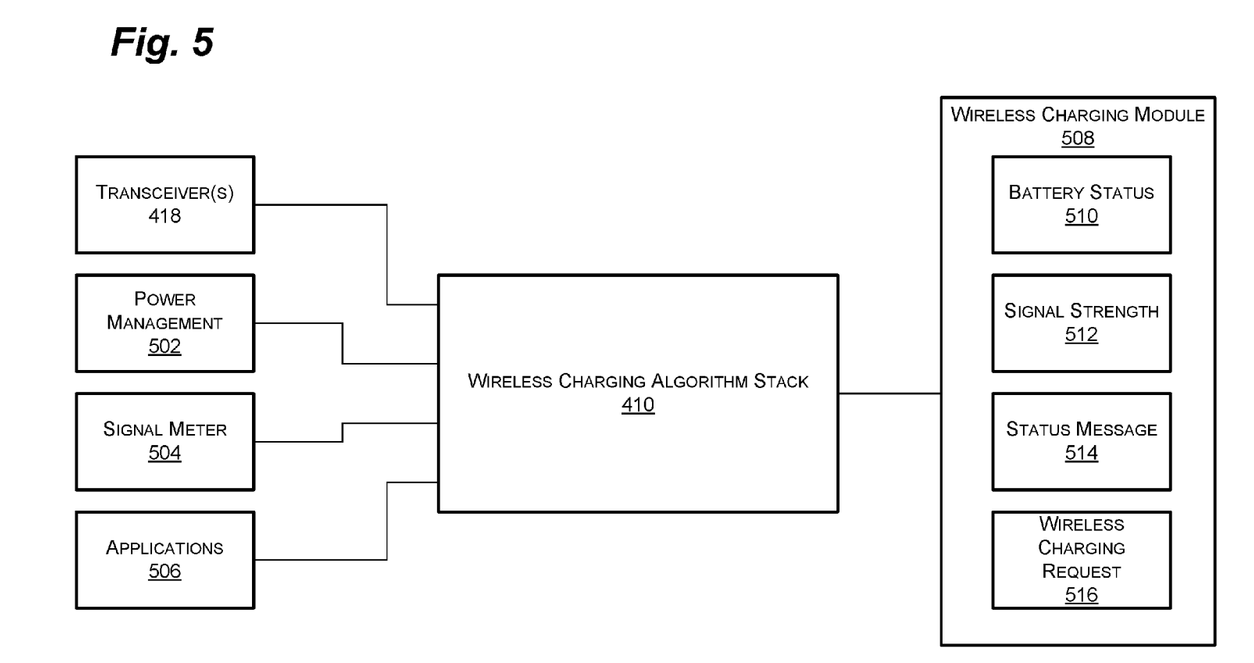
FIG. 5 depicts a wireless charging application, in accordance with some examples of the present disclosure.

FIG. 5 is an example of the wireless charging algorithm stack 410 associated with the methods 100, 200, 300 discussed above. In some examples, the wireless charging algorithm stack 410 can comprise an app on the UE, for example, or a function in the UE settings with a toggle switch. In other examples, the wireless charging algorithm stack 410 can comprise firmware associated with the chipset on the UE. In still other examples, the wireless charging algorithm stack 410 may be part of the OS of the UE. In still other examples, some, or all, of the components of the wireless charging algorithm stack 410 can be located on a network component (e.g., HLR, HSS, 3GPP AAA, etc.).

The wireless charging algorithm stack 410 can receive one or more inputs from various components on the UE, send data to the network, send requests to the network, receive instructions from the network, and/or manage the wireless charging process. As shown, the wireless charging algorithm stack 410 can receive information about the available of the UE 400 from various sources inside the UE 400. The wireless charging algorithm stack 410 can then send this information, which may be packaged together by the wireless charging algorithm stack 410, to the network to activate and deactivate wireless charging.

In some examples, the wireless charging algorithm stack 410 can receive status information from the transceiver(s) 418 of the UE 400. In other words, if the UE 400 is on a call or accessing the Internet, for example, then the transceiver(s) 418 will show a certain level of activity. As mentioned above, whether the UE 400 is capable of wireless charging while performing other duties may depend on the bandwidth consumption of a particular activity or application. So, the UE 400 may be able to wirelessly charge when texting (low bandwidth consumption), for example, but not when streaming video (high bandwidth consumption). IN some examples, the wireless charging algorithm stack 410 may determine whether to send a request based on a percentage of bandwidth available (e.g., charging is available when less than 50% of the bandwidth is being used.

In some examples, the wireless charging algorithm stack 410 can also receive input from one or more power management 502 facilities on the UE 400. In some examples, this may include, for example, an input from the battery level graphic on the UE 400 (i.e., the module that provides the battery level on the screen of the UE 400). In other examples, this may include a direct sensor (e.g., voltage sensor) in communication with the battery of the UE 400 or other power connection on the UE 400. As mentioned above, wireless charging may be initiated at a first threshold charge level (e.g., 70 or 80%) and stopped a second threshold charge level (e.g., 80 or 90%).

The wireless charging algorithm stack 410 can also be in communication with a signal meter 504 on the UE 400. This can include a connection to the aforementioned transceivers 418, which may monitor signal strength for the purposes of choosing a network protocol (e.g., 3G vs. 4G). This can also include an input from the module that provides the signal meter graphic on the display of the UE 400. In other examples, the wireless charging algorithm stack 410 may have a dedicated signal meter 504 to provide additional granularity (i.e., a dBm level instead of the simple one to "five bars" provided on the UE 400). As mentioned above, the wireless charging algorithm stack 410 may request wireless charging only when signal strength is above a threshold signal strength (e.g., above −85 dBm).

In some examples, the wireless charging algorithm stack 410 can also include inputs from applications 506 running on the UE 400 (or a task manager, or similar). If, for example, a high demand application such as, for example, video players or internet browsers are running, the wireless charging algorithm stack 410 may determine that there is insufficient bandwidth for wireless charging. In addition, the wireless charging algorithm stack 410 may determine that, due to the activity of the applications 506, the UE 400 is not sufficiently idle for wireless charging. In some examples, the wireless charging algorithm stack 410 may enable wireless charging when some applications 506, or combinations of applications 506, are running, but not others.

Of course, many applications 506 run in the background and the UE 400 is rarely completely idle. To this end, in some examples, each application 506 may be assigned a utilization score by the wireless charging algorithm stack 410. In other words, applications 506 can be scored in the wireless charging algorithm stack 410 based on their nominal use of bandwidth and/or processing power on the UE 400. Thus, small applications 506 or applications 506 that consume fewer resources (i.e., less processor time, memory, bandwidth, etc.) 506 can be assigned a low utilization score, while large applications 506 with high resource consumption can be assigned a high utilization score.

Applications 506 may also be assigned an "active" utilization score and a "background," or "standby," utilization score. An internet browser that is currently being used by the user to surf the Internet, for example, can have a higher utilization score than the same application 506 when it is open, but not currently being used. In this manner, the wireless charging algorithm stack 410 can determine whether to initiate wireless charging based on the total utilization score of all applications 506 running (actively or in the background) on the UE 400.

Based on these, and other, inputs, the wireless charging algorithm stack 410 can provide information and/or wireless charging requests to the network. In some examples, wireless charging on the network side can be handled by a wireless charging feature 508, which may be a component of the HLR, HSS, 3GPP AAA server, or another network component. Regardless, in some examples, the wireless charging feature 508 may receive raw or packeted data from the wireless charging algorithm stack 410 and then determine whether wireless charging should be activated based on this data.

So, for example, the wireless charging feature 508 may receive a battery status 510 as a percentage of battery charge, a capacity (e.g., mAh), or other unit from the wireless charging algorithm stack 410 on the UE 400. The wireless charging feature 508 can also receive data related to the current signal strength 512 of the UE 400. As mentioned above, this may be provided in the form of a percentage of maximum signal strength or a raw dBm measurement. In some examples, it can be expressed as a percentage of the threshold signal strength. In other words, anything equal to or greater than 100% of the threshold signal strength is sufficient for wireless charging. The wireless charging feature 508 can also receive a status message 514 from the UE 400. In some examples, the status message 514 can simply be a binary message indicating that the UE 400 is "idle" or "not idle." In this configuration, any activity on the UE 400 can preclude wireless charging. In other examples, as discussed above, the status message 514 can be given as a utilization score or a percentage of utilization. In this configuration, any utilization above a certain utilization score or utilization percentage (e.g., above 20%) can preclude wireless charging.

In some examples, the wireless charging feature 508 can determine whether to initiate wireless charging internally, based on the inputs 510, 512, 514 provided by the wireless charging algorithm stack 410. Thus, if the various criteria for battery level, signal strength, and utilization are all above the threshold levels for these inputs, the wireless charging feature 508 can send a signal to the UE 400 (e.g., the chipset) to begin wireless charging. The wireless charging feature 508 can then start the billing process or send a signal to another network component (e.g., the 3GPP AAA server) to begin billing.

In some examples, all monitoring and calculations can be performed by the wireless charging algorithm stack 410, with the wireless charging feature 508 merely looking for a wireless charging request 516 from the wireless charging algorithm stack 410. In this configuration, the wireless charging algorithm stack 410 can merely send a wireless charging request 516 to the wireless charging feature 508. Upon approval, as discussed above, the wireless charging algorithm stack 410 can begin wireless charging on the UE 400. In this configuration, the wireless charging request 516 can be used to validate the UE 400 (i.e., to confirm the UE 400 is authorized for wireless billing) and to initiate billing. In still other examples, the wireless charging feature 508 can receive inputs 510, 512, 514 and a wireless charging request 516 from the wireless charging algorithm stack 410 prior to initiating wireless charging and billing.

Figure 6:
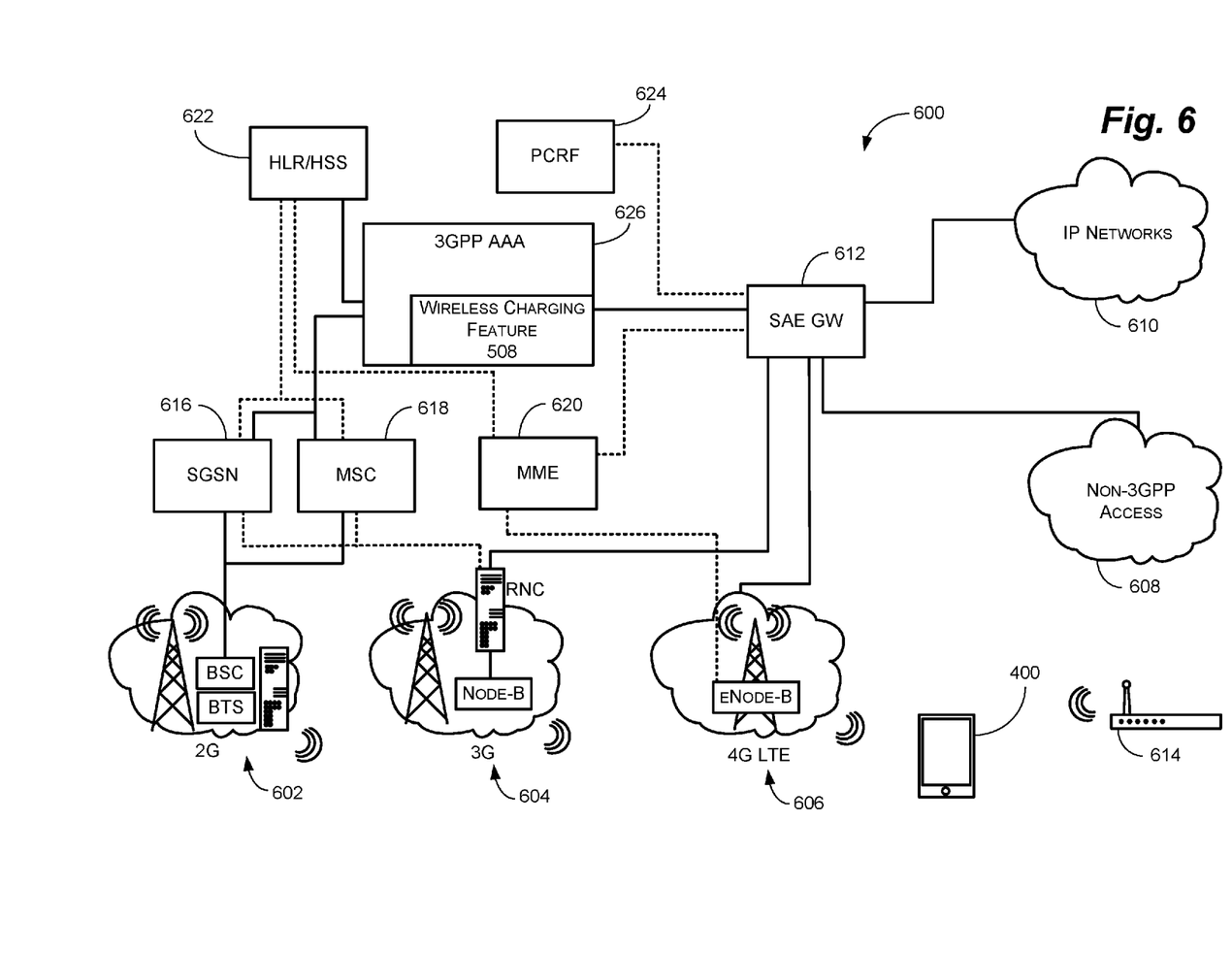
FIG. 6 depicts a cellular network for use with the wireless charging application, in accordance with some examples of the present disclosure.

FIG. 6 depicts a conventional cellular network 600 including 2G 602, 3G 604, and 4G long-term evolution (LTE) 606 components. Of course, future technologies, such as, for example, 6G and device-to-device (D2D) components could also be included and are contemplated herein. As mentioned above, many of the "back-end" components of the network 600 could handle some, or all, of the methods 100, 200, 300 associated with wireless charging. Indeed, some, or all, of the aforementioned wireless charging algorithm stack 410 and wireless charging feature 508 components could be located on one or more of, for example, the HLR/HSS 622, the 3GPP AAA server 626, or other components.

As is known in the art, data can be routed from the Internet or other sources using a circuit switched modem connection (or non-3GPP connection) 608, which provides relatively low data rates, or via IP based packet switched 610 connections, which results is higher bandwidth. The LTE system 606, which is purely IP based, essentially "flattens" the architecture, with data going straight from the internet to the service architecture evolution gateway (SAE GW) 612 to evolved Node B transceivers 606, enabling higher throughput. Many UEs 400 also have wireless local area network (WLAN) 614 capabilities, in some cases enabling even higher throughput. In some cases, cellular carriers may use WLAN communications in addition to, or instead of, cellular communications to supplement bandwidth.

The serving GPRS support node (SGSN) 616 is a main component of the general packet radio service (GPRS) network, which handles all packet switched data within the network 600—e.g. the mobility management and authentication of the users. The mobile switching center (MSC) 618 essentially performs the same functions as the SGSN 616 for voice traffic. The MSC 618 is the primary service delivery node for global system for mobile communication (GSM) and code division multiple access (CDMA), responsible for routing voice calls and short messaging service (SMS) messages, as well as other services (such as conference calls, fax, and circuit switched data). The MSC 618 sets up and releases the end-to-end connection, handles mobility and hand-over requirements during the call, and takes care of charging and real time pre-paid account monitoring.

Similarly, the mobility management entity (MME) 620 is the key control-node for the 4G LTE network 606. It is responsible for idle mode UE 400 paging and tagging procedures including retransmissions. The MME 620 is involved in the bearer activation/deactivation process and is also responsible for choosing the SAE GW 612 for the UE 400 at the initial attach and at time of intra-LTE handover involving Core Network (CN) node relocation (i.e., switching from one cell tower to the next when traveling). The MME 620 is responsible for authenticating the user (by interacting with the HSS 622 discussed below). The Non-Access Stratum (NAS) signaling terminates at the MME 620 and it is also responsible for generation and allocation of temporary identities to UE 400. The MME 620 also checks the authorization of the UE 400 to camp on the service provider's HPLMN or VPLMN and enforces UE 400 roaming restrictions on the VPLMN. The MME 620 is the termination point in the network for ciphering/integrity protection for NAS signaling and handles the security key management. The MME 620 also provides the control plane function for mobility between LTE 606 and 2G 602/3G 604 access networks with the S3 interface terminating at the MME 620 from the SGSN 616. The MME 620 also terminates the S6a interface towards the home HSS 622 for roaming UEs 400.

The HSS/HLR 622 is a central database that contains user-related and subscription-related information. The functions of the HSS/HLR 622 include functionalities such as mobility management, call and session establishment support, user authentication and access authorization. The HSS, which is used for LTE connections, is based on the previous HLR and Authentication Center (AuC) from CGMA and GSM technologies, with each serving substantially the same functions for their respective networks.

The policy and charging rules unction (PCRF) 624 is a software node that determines policy rules in the network 600. The PCRF 624 is generally operates at the network core and accesses subscriber databases (e.g., the HSS/HLR 622) and other specialized functions, such as a charging system, in a centralized manner. The PCRF 624 is the main part of the network 600 that aggregates information to and from the network 600 and other sources (e.g., IP networks 610). The PCRF 624 can support the creation of rules and then can automatically make policy decisions for each subscriber active on the network 600. The PCRF 624 can also be integrated with different platforms like billing, rating, charging, and subscriber database or can also be deployed as a standalone entity.

Finally, the 3GPP AAA server 626 is general located within the HPLMN. The 3GPP AAA server 626 performs authentication, authorization, and accounting (AAA) functions and may also act as an AAA proxy server. For WLAN 614 access to (3GPP) IP networks 610 the 3GPP AAA Server 626 provides authorization, policy enforcement, and routing information to various WLAN components. The 3GPP AAA Server 626 can generate and report charging/accounting information, performs offline charging control for the WLAN 614, and perform various protocol conversions when necessary.

As shown, in some examples, the 3GPP AAA server 626 can contain some, or all, of the components of the wireless charging feature 508. Of course, as mentioned above, other components (e.g., the HSS/HLR 622) could also include some, or all, of the wireless charging feature 508.

While several possible examples are disclosed above, examples of the present disclosure are not so limited. For instance, while the systems and methods above are discussed with reference to use with cellular RF signals for wireless charging, the systems and methods can be used with other types of wireless data and communications systems such as Wi-Fi and microwave. In addition, while the various controls and buttons are generally shown as selectable buttons on a touchscreen for the UEs 400, these controls and buttons could easily be inputs from actual, physical button, voice commands, or other types of interfaces on the UE 400 or associated with the UE 400.

The specific configurations, machines, and the size and shape of various elements can be varied according to particular design specifications or constraints requiring a GUI, system, or method constructed according to the principles of this disclosure. Such changes are intended to be embraced within the scope of this disclosure. The presently disclosed examples, therefore, are considered in all respects to be illustrative and not restrictive. The scope of the disclosure is indicated by the appended claims, rather than the foregoing description, and all changes that come within the meaning and range of equivalents thereof are intended to be embraced therein.

What is claimed is:

1. A method comprising:
    receiving, at a wireless charging algorithm stack of a user equipment (UE), a first signal from a battery meter of the UE indicating a current charge level for a battery of the UE;
    receiving, at the wireless charging algorithm stack, a second signal from a signal meter of the UE indicating a current signal strength at the UE from a wireless communications network;
    receiving, at the wireless charging algorithm stack, a third signal from one or more components of the UE, one or more applications on the UE, or both indicating a current utilization rate of the UE;
    determining, with a processor of the UE, that the current charge level is below a first threshold charge level;
    determining, with the processor of the UE, that the current signal strength exceeds a threshold signal strength;
    determining, with the processor of the UE, that the current utilization rate is below a threshold utilization rate; and
    sending a first request from the wireless charging algorithm stack to a wireless charging feature associated with the wireless communications network to initiate wireless charging.

2. The method of claim 1, wherein receiving, at the wireless charging algorithm stack, the third signal from the one or more components of the UE indicating the current utilization rate of the UE comprises receiving a signal from a transceiver of the UE indicating whether the transceiver is sending or receiving data to the wireless communications network.

3. The method of claim 1, wherein receiving, at the wireless charging algorithm stack, the third signal from the one or more components of the UE indicating the current utilization rate of the UE comprises receiving a signal from the one or more applications on the UE indicating that the one or more applications are in standby mode on the UE.

4. The method of claim 1, wherein determining, with the processor of the UE, that the current utilization rate is below a threshold utilization rate comprises:
    calculating a utilization score for each of the one or more components, each of the one or more applications, or both; and
    combining the utilization score for each of the one or more components, each of the one or more applications, or both to calculate a total utilization score.

5. The method of claim 4, wherein each of the one or more components, each of the one or more applications, or both comprise an active utilization score and a standby utilization score; and
    wherein the active utilization score is higher than the standby utilization score.

6. The method of claim 1, further comprising:
    determining, with the processor of the UE, that a current charge level exceeds a second threshold charge level; and
    sending a second request from the wireless charging algorithm stack to a wireless charging feature associated with the wireless communications network to stop wireless charging.

7. The method of claim 6, wherein the second threshold charge level is higher than the first threshold charge level.

8. A method comprising:
    receiving, at a wireless charging algorithm stack of a user equipment (UE), a first signal from a battery meter of the UE indicating a first charge level at a first time for a battery of the UE;
    determining, with a processor of the UE, that the first charge level is above a first threshold charge level;
    starting a first timer in the wireless charging algorithm stack to recheck a current charge level in a predetermined amount of time;

determining, with the processor of the UE, that the first timer has expired;

receiving, at a wireless charging algorithm stack of the UE, a second signal from the battery meter of the UE indicating a second charge level at a second time for the battery of the UE; and determining, with a processor of the UE, that the second charge level is below the first threshold charge level;

wherein the first threshold charge level is associated with a charge level at which the wireless charging algorithm stack is programmed to start wireless charging via a radio frequency (RF) carrier wave of a wireless communications network.

9. The method of claim 8, further comprising:

receiving, at the wireless charging algorithm stack, a third signal from a signal meter of the UE indicating a first signal strength at a first time from the wireless communications network at the UE;

determining, with the processor of the UE, that the first signal strength is below a threshold signal strength;

starting a second timer in the wireless charging algorithm stack to recheck a current signal strength in a predetermined amount of time;

determining, with the processor of the UE, that the second timer has expired;

receiving, at the wireless charging algorithm stack, a fourth signal from the signal meter of the UE indicating a second signal strength at the UE at a second time from the wireless communications network; and determining, with the processor of the UE, that the second signal strength is above the threshold signal strength;

wherein the threshold signal strength is associated with a signal strength from the wireless communications network at which the wireless charging algorithm stack is programmed to start wireless charging via a radio frequency (RF) carrier wave of a wireless communications network.

10. The method of claim 9, further comprising:

receiving, at the wireless charging algorithm stack, a fifth signal from one or more components of the UE, one or more applications on the UE, or both indicating a first utilization rate of the UE;

determining, with the processor of the UE, that the first utilization rate is above a threshold utilization rate;

starting a third timer in the wireless charging algorithm stack to recheck a current utilization rate in a predetermined amount of time;

determining, with the processor of the UE, that the third timer has expired;

receiving, at the wireless charging algorithm stack, a sixth signal from the one or more components of the UE, the one or more applications on the UE, or both indicating a second utilization rate of the UE;

determining, with the processor of the UE, that the second utilization rate is below a threshold utilization rate; and sending a request from the wireless charging algorithm stack to a wireless charging feature associated with the wireless communications network to start wireless charging.

11. The method of claim 10, further comprising:

receiving, at a wireless charging algorithm stack of a user equipment (UE), a seventh signal from the battery meter of the UE indicating a third charge level at a third time for a battery of the UE;

determining, with a processor of the UE, that the third charge level is above a second threshold charge level; and sending a request from the wireless charging algorithm stack to the wireless charging feature to stop wireless charging.

12. The method of claim 10, further comprising:

receiving, at the wireless charging algorithm stack, a sixth signal from the signal meter of the UE indicating a third signal strength at a third time from the wireless communications network at the UE;

determining, with the processor of the UE, that the third signal strength is below the threshold signal strength; and sending a request from the wireless charging algorithm stack to the wireless charging feature to stop wireless charging.

13. The method of claim 10, further comprising:

receiving, at the wireless charging algorithm stack, a sixth signal from one or more components of the UE, one or more applications on the UE, or both indicating a third utilization rate of the UE;

determining, with the processor of the UE, that the third utilization rate is above the threshold utilization rate; and sending a request from the wireless charging algorithm stack to the wireless charging feature to stop wireless charging.

14. A user equipment (UE) comprising:

a display;

one or more input devices to receive inputs from a user;

one or more transceivers to send and receive one or more wireless transmissions;

one or more processors in communication with at least the display, the one or more transceivers, and the one or input devices; and memory storing a wireless charging algorithm stack that, when executed, causes the one or more processors to:

display, on the display, a prompt to solicit a response from the user regarding using wireless charging;

receive, from the one or more input devices, a signal indicating that the user would like to use wireless charging;

determine that a current charge level is below a first threshold charge level;

determine that a current signal strength exceeds a threshold signal strength;

determine that a current utilization rate is below a threshold utilization rate; and send, with the one or more transceivers, a first request from the wireless charging algorithm stack to a wireless charging feature associated with a wireless communications network to initiate wireless charging.

15. The UE of claim 14, the memory further causing the one or more processors to:

send, with the one or more transceivers, a second request from the wireless charging algorithm stack to the wireless charging feature associated with the wireless communications network to update a billing status of the UE to include wireless charging.

16. The UE of claim 14, the memory further causing the one or more processors to:

determine that a current charge level is above a second threshold charge level; and send, with the one or more transceivers, a second request from the wireless charging algorithm stack to the wireless charging feature associated with the wireless communications network to stop wireless charging.

17. The UE of claim 16, wherein the first threshold charge level indicates that a battery on the UE is between 50-80% charged; and wherein the second threshold charge level indicates that a battery on the UE is between 90-100% charged.

18. The UE of claim 14, wherein the display comprises a touchscreen; and wherein receiving, from the one or more input devices, the signal indicating that the user would like to use wireless charging comprises receiving an output from the touchscreen.

19. The UE of claim 14, wherein determining that the current utilization rate is below the threshold utilization rate comprises determining that the UE is not currently being used for a voice call or a text message.

20. The UE of claim 14, wherein determining that the current signal strength exceeds the threshold signal strength comprises determining that the current signal strength is between −55 dBm and −85 dBm.

* * * * *